Patented Oct. 26, 1943

2,332,517

UNITED STATES PATENT OFFICE 2,332,517

CYANINE DYESTUFF INTERMEDIATES

John David Kendall, Ilford, England, assignor to Ilford Limited, Ilford, England, a company of Great Britain No Drawing. Application February 16, 1942, Serial No. 431,167. In Great Britain April 7, 1941

12 Claims. (Cl. 260—240)

This invention relates to the production of organic compounds and particularly to the production of dyestuff intermediates.

According to the present invention dyestuff intermediates are obtained by condensing a quaternary salt of a heterocyclic nitrogen compound containing a reactive methyl or mono-substituted methyl group in the α or γ position to the heterocyclic quaternary nitrogen atom with an excess over one molecular equivalent of a compound of the formula:

where the groups $R_2$ are hydrocarbon residues, e. g. alkyl, aryl or aralkyl groups, in the presence of a base and a solvent.

The course of the reaction is believed to be as follows:

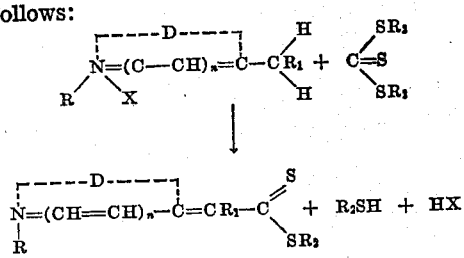

In this equation D represents the residue of a heterocyclic nitrogen compound, R represents an alkyl or aralkyl group, $R_1$ represents a hydrogen atom or an alkyl, aryl or aralkyl group, $R_2$ represents an alkyl, aryl or aralkyl group, X represents an acid residue (e. g. chloride, bromide, iodide, sulphate, p-toluene sulphonate or perchlorate) and $n$ is nought or 1.

Any of the known types of heterocyclic quaternary ammonium compounds containing the specified reactive methyl group previously described for use in the manufacture of cyanine dyes may be employed in the process of the present invention. Examples are the substituted and unsubstituted thiazoles, oxazoles, selenazoles and their polycyclic homologues such as those of the benzene, naphthalene, acenaphthene and anthracene series; pyridine and its polycyclic homologues such as quinoline and α and β naphthaquinolines; lepidines; indolenines; diazines; such as pyrimidines and quinazolines; diazoles (e. g. thio-ββ'-diazole); oxazolines, thiazolines and selenazolines. The polycyclic compounds of these series may also be substituted in the carbocyclic rings with one or more groups such as alkyl, aryl, amino, hydroxy, alkoxy and methylene dioxy groups, or by halogen atoms.

In the foregoing formulae the groups R, $R_1$ and $R_2$ may be alkyl groups and examples are the methyl, ethyl, propyl and higher alkyl groups, allyl and similar unsubstituted groups, or they may be aralkyl groups, e. g. benzyl groups; $R_1$ and $R_2$ may be an aryl group, e. g. phenyl or naphthyl groups.

The reaction may be effected by heating the reagents together in the presence of a base and a solvent. However, there is a tendency to the formation of a certain amount of dyestuff formed as described in my co-pending application No. 431,166 (filed on even date herewith) corresponding to British application No. 4603/41 and to avoid this, as far as possible, the reaction is preferably effected in the presence of an excess of a strong base. A solution of diethylamine or triethylamine in ethyl or methyl alcohol is very suitable.

The following examples illustrate the invention:

EXAMPLE I

Preparation of (N-methyl-dihydro-benzthiazolyl-idene-1)-dithioacetic acid methyl ester 6 gms. of 1-methyl benzthiazole and 7.6 gms. of methyl-p-toluene sulphonate were mixed together and fused for three hours at 130–140° C. To the cooled product there was added 8.5 gms. of dimethyl trithiocarbonate and 60 ccs. of absolute alcohol. The mixture was boiled and 8 ccs. of triethylamine were then added. The mixture was then boiled for a further half hour and then poured into an aqueous solution of potassium iodide, whereupon the product precipitated out. On recrystallisation from benzene solution, the product was obtained as a light brown solid, melting at 185° C.

EXAMPLE II

Preparation of (N-methyl-1.2-dihydroquinolyli-dene-2)-dithioacetic acid methyl ester 2.85 gms. of quinaldine methiodide, 1.38 gms. of dimethyl trithiocarbonate and 30 ccs. of ethyl alcohol were mixed together and boiled. 2 ccs. of triethylamine were then added and the mixture boiled for a further hour and then cooled. The solution was then diluted with water whereupon an oily solid was precipitated. This was washed with ethyl alcohol and finally extracted with dry benzene. The product crystallised out from the benzene solution as a brown solid, melting at 154° C.

Example III

*Preparation of (N-ethyl dihydro benzthiazolylidene-1)-dithio-acetic acid methyl ester*

This intermediate was prepared by the general process set forth in Example I employing 20 gms. of 1-methyl benzthiazole, 27 gms. of ethyl-p-toluene sulphonate, 20 gms. of dimethyltrithiocarbonate, 120 ccs. of ethyl alcohol and 25 ccs. of diethylamine. The product was obtained as an orange-yellow solid, melting at 139° C.

Example IV

*Preparation of (2-ethyl-4.5-dimethoxy-dihydrobenzthiazolylidene-1)-dithio-acetic acid methyl ester*

8.4 gms. of 4.5-dimethoxy-1-methyl benzthiazole and 8.0 gms. of ethyl-p-toluene sulphonate were mixed together and fused for 3 hours at 140–150° C. The cooled product was dissolved in 40 ccs. of ethyl alcohol and 4 gms. of dimethyl trithiocarbonate and 4 ccs. of triethylamine were added. The mixture was boiled for 2 hours and then poured into aqueous potassium iodide solution. A brown solid was precipitated and on recrystallisation from benzene solution yielded the product as a light brown solid, melting at 213° C.

Example V

*Preparation of (2-ethyl-4-methyl-dihydro-benzthiazolylidene-1)-dithioacetic acid methyl ester*

8.2 gms. of 1.4-dimethyl benzthiazole and 10.0 gms. of ethyl-p-toluene sulphonate were mixed together and fused for 3 hours at 140° C. To the cooled mixture there was added 40 ccs. of ethyl alcohol, 5 ccs. of triethylamine and 7 ccs. of dimethyl trithiocarbonate. The solution was boiled for 2 hours and then poured into aqueous potassium iodide solution. A black solid was precipitated and on recrystallisation from petroleum ether yielded the desired product as a brown solid melting at 174° C.

The dyestuff intermediates produced according to the present invention may be converted to other intermediates by treatment with alkyl or aralkyl salts. The course of the reaction is believed to be as follows:

$$\underset{R}{\overset{\overbrace{\quad\quad D\quad\quad}}{N}}-(CH=CH)_n-\overset{}{C}=CR_1-C\overset{S}{\underset{SR_2}{\diagdown\!\!\!/}} + R_2X$$

$$\downarrow$$

$$\underset{R\quad X}{\overset{\overbrace{\quad\quad D\quad\quad}}{N}}=(CH-CH)_n=\overset{}{C}-CR_1=C\overset{SR_2}{\underset{SR_2}{\diagdown\!\!\!/}}$$

These latter intermediates are the same as those described in my co-pending application No. 431,165 (filed on even date herewith) corresponding to British application No. 4602/41 and both types of intermediates may be used for the production of dyestuffs as described in that application.

What I claim is:

1. Process for the manufacture of dyestuff intermediates which comprises condensing a quaternary salt of a heterocyclic nitrogen compound containing in one of the α and γ positions to the heterocyclic quaternary nitrogen atom a reactive group selected from the class consisting of reactive methyl and reactive mono-substituted methyl groups, with an excess over one molecular equivalent of a compound of the general formula:

$$C\overset{S}{\underset{SR_2}{\diagdown\!\!\!/}}-SR_2$$

where the groups $R_2$ are hydrocarbon residues, in the presence of a base and a solvent.

2. Process according to claim 1 wherein the reaction is effected in the presence of an excess of a strong base.

3. Process according to claim 1 wherein the reaction is effected in the presence of an alkylamine dissolved in a lower aliphatic alcohol.

4. Process for the manufacture of dyestuff intermediates which comprises condensing a quaternary salt of a heterocyclic nitrogen compound containing in one of the α and γ positions to the heterocyclic quaternary nitrogen atom a reactive group selected from the class consisting of reactive methyl and reactive mono-substituted methyl groups, with an excess over one molecular equivalent of dimethyl trithiocarbonate, in the presence of a base and a solvent.

5. Dyestuff intermediates of the general formula:

$$\underset{R}{\overset{\overbrace{\quad\quad D\quad\quad}}{N}}-(CH=CH)_n-\overset{}{C}=CR_1-C\overset{S}{\underset{SR_2}{\diagdown\!\!\!/}}$$

where D represents the atoms necessary to complete a heterocyclic nitrogen compound, R is selected from the class consisting of alkyl and aralkyl groups, $R_1$ is selected from the class consisting of hydrogen atoms and alkyl, aryl and aralkyl groups, $R_2$ is selected from the class consisting of alkyl, aryl and aralkyl groups and $n$ is selected from the class consisting of nought and 1.

6. Dyestuff intermediates of the general formula:

$$\underset{R}{\overset{\overbrace{\quad\quad D\quad\quad}}{N}}-(CH=CH)_n-\overset{}{C}=CR_1C\overset{S}{\underset{SCH_3}{\diagdown\!\!\!/}}$$

where D represents the atoms necessary to complete a heterocyclic nitrogen compound, R is selected from the class consisting of alkyl and aralkyl groups, $R_1$ is selected from the class consisting of hydrogen atoms and alkyl, aryl and aralkyl groups, and $n$ is selected from the class consisting of nought and 1.

7. (N-methyl-1,2-dihydroquinolylidine-2)-dithioacetic acid methyl ester.

8. Process which comprises condensing quinaldine methiodide with dimethyl trithiocarbonate in the presence of an excess of a lower alkylamine and a lower saturated aliphatic alcohol.

9. (N-ethyl-dihydrobenzthiazolylidene-1)-dithioacetic acid methyl ester.

10. Process which comprises condensing 1-methyl benzthiazole with ethyl-p-toluene sulfonate and dimethyl trithiocarbonate in the presence of an excess of a lower alkylamine and a lower saturated aliphatic alcohol.

11. (2-ethyl-4-methyl-dihydrobenzthiazolylidene-1)-dithioacetic acid methyl ester.

12. The process which comprises condensing 1,4-dimethylbenzthiazole with ethyl-p-toluene sulfonate and dimethyl trithiocarbonate in the presence of an excess of a lower alkylamine and a lower saturated aliphatic alcohol.

JOHN DAVID KENDALL.